United States Patent
Prasad et al.

(10) Patent No.: US 11,670,031 B2
(45) Date of Patent: Jun. 6, 2023

(54) SYSTEM AND METHOD FOR AUTOMATICALLY GENERATING AN AVATAR WITH PRONOUNCED FEATURES

(71) Applicant: TALENT UNLIMITED ONLINE SERVICES PRIVATE LIMITED, Delhi (IN)

(72) Inventors: Ankit Prasad, Gurugram (IN); Rahul Prasad, Gurugram (IN); Lovely Kukreja, Delhi (IN)

(73) Assignee: TALENT UNLIMITED ONLINE SERVICES PRIVATE LIMITED, Delhi (IN)

( * ) Notice: Subject to any disclaimer, the term of this patent is extended or adjusted under 35 U.S.C. 154(b) by 0 days.

(21) Appl. No.: 17/383,417

(22) Filed: Jul. 22, 2021

(65) Prior Publication Data
US 2022/0028149 A1 Jan. 27, 2022

(51) Int. Cl.
*G06T 13/40* (2011.01)
*G06T 7/11* (2017.01)
(Continued)

(52) U.S. Cl.
CPC ............ *G06T 13/40* (2013.01); *G06T 7/11* (2017.01); *G06T 7/194* (2017.01); *G06T 15/205* (2013.01);
(Continued)

(58) Field of Classification Search
CPC ........ G06N 20/00; G06F 3/012; G06V 10/82; G06V 40/171; G06V 10/70; G06V 40/176; G06V 40/161; G06V 20/20; G06V 40/168; G06V 40/166; G06V 40/165; G06V 10/25; G06V 40/172; G06V 10/40; G06V 10/454; G06V 40/162; G06V 40/174; G06V 40/193; G06V 10/751; G06V 10/44;
(Continued)

(56) References Cited

U.S. PATENT DOCUMENTS 10,452,896 B1 * 10/2019 Weise ............... G06T 13/40
2009/0087035 A1 * 4/2009 Wen ............... G06V 40/168
382/118
(Continued)

*Primary Examiner* — Xiao M Wu
*Assistant Examiner* — Scott E Sonners
(74) *Attorney, Agent, or Firm* — Barry Choobin; Patent 360LLC

(57) ABSTRACT

A system including an avatar generation engine (AGE) (607) and a method for automatically generating an avatar with pronounced features are provided. The AGE (607) extracts a primary image of a primary component, for example, a face component, and a secondary image of a secondary component, for example, a hair component, from an input image of a target object. The AGE (607) normalizes and processes the primary image for extracting a feature image corresponding to a feature indicating a distinct characteristic of the target object. The AGE (607) processes the extracted feature image for graphically pronouncing the features. The AGE (607) generates a primary canvas including a predicted tone of the primary component. The AGE (607) generates an avatar with pronounced features by merging a primary graphical image generated by merging the primary canvas with the graphically pronounced features, with a secondary graphical image of the secondary component.

15 Claims, 6 Drawing Sheets

(51) Int. Cl.
*G06T 7/20* (2017.01)
*G06T 7/194* (2017.01)
*G06V 40/16* (2022.01)
*G06T 15/20* (2011.01)

(52) U.S. Cl.
CPC .. *G06V 40/171* (2022.01); *G06T 2207/30201* (2013.01)

(58) Field of Classification Search
CPC .. G06V 10/7557; G06V 10/758; G06V 10/17; G06V 10/255; G06V 10/467; G06V 10/462; G06V 10/771; G06V 10/235; G06T 13/40; G06T 2207/30201; G06T 19/20; G06T 7/11; G06T 19/006; G06T 2207/20084; G06T 2207/10016; G06T 2207/10024; G06T 7/73; G06T 2219/2021; G06T 11/001; G06T 7/90; G06T 2207/20081; G06T 7/13; G06T 15/02; G06T 7/194; G06T 3/0093; G06T 7/248; G06T 7/40; G06T 17/00; G06T 2200/24; G06T 2207/30196; G06T 2219/2024; G06T 2207/20221; G06T 2215/16; G06T 7/60; G06T 7/70; G06T 7/74; G06T 13/20; G06T 19/00; G06T 2210/44; G06T 13/00; G06T 5/00; G06T 2200/04; A63F 13/213; A63F 2300/5553; A63F 13/655

See application file for complete search history.

(56) References Cited

U.S. PATENT DOCUMENTS

| | | | |
|---|---|---|---|
| 2009/0220149 A1* | 9/2009 | Menadeva | G06V 10/46 382/199 |
| 2019/0340419 A1* | 11/2019 | Milman | G06N 3/088 |
| 2020/0034996 A1* | 1/2020 | Qian | G06V 10/17 |
| 2021/0005003 A1* | 1/2021 | Chong | G06V 40/171 |
| 2021/0027513 A1* | 1/2021 | Choi | G06K 9/627 |

* cited by examiner

SYSTEM AND METHOD FOR AUTOMATICALLY GENERATING AN AVATAR WITH PRONOUNCED FEATURES

CROSS-REFERENCE TO RELATED APPLICATIONS

This application claims the priority and the benefit of the Indian Provisional Patent Application (PPA) with serial number 202011026315 filed on Jun. 22, 2020 with the title, "System and Method for Automatically Generating an Avatar with Pronounced Features", and subsequently postdated by one month to Jul. 22, 2020, and the contents of which is incorporated in its entirety by reference herein.

BACKGROUND

Technical Field

The embodiments herein are generally related to digital image processing and computer graphics. The embodiments herein are particularly related to digital image processing of computer graphics such as avatars, used in a variety of computing environments, such as, gaming environments, electronic learning environments, social media environments, and other virtual environments etc. The embodiments herein are more particularly related to a system and a method for automatically generating an avatar with pronounced features in real time.

Description of the Related Art

Graphical images, for example, avatars, are used in a variety of computing environments, for example, gaming environments, electronic learning environments, social media environments, etc., and other virtual environments. In digital technology, an avatar refers to a graphical representation of a person or a person's character. Avatars provide an identification of a person or a user who operates in various computing environments. However, most graphical representations of persons or users are limited and do not adequately represent detailed characteristics thereof. If a user wishes to create a cartoonized version of their appearance, some conventional systems require the user to select facial features, for example, hair, eyes, lips, etc., from preconfigured templates, which results in generating an avatar that is dissimilar to the user's face and does not uniformly and adequately represent the user's real appearance and characteristics. Other conventional systems perform simplistic modifications of photographic data to generate avatars in a time-intensive manner. These conventional systems typically generate avatars, for example, with unclear hair, too many face lines, vaguely represented facial features, and a static face tone.

Hence, there is a long-felt need for a system and a method for automatically generating an avatar with pronounced features by cartoonizing a user's real appearance and characteristics from a user's photographic image in real time with minimal user intervention.

OBJECTS OF THE EMBODIMENTS HEREIN

An object of the embodiments herein is to develop a system and a method for automatically generating an avatar with pronounced features by cartoonizing a user's real appearance and characteristics from a user's photographic image in real time with minimal user intervention.

Another object of the embodiments herein is to automatically predict the user's face tone from an input image and merge the predicted face tone with graphically pronounced features of the user to generate the avatar.

Yet another object of the embodiments herein is to generate avatars for different image resolutions, lighting conditions, and user positions, face angles, stances, and poses.

The objects disclosed above will be realized and achieved at least by the elements, features, and combinations particularly disclosed in the detailed description that follows. The objects disclosed above have outlined, rather broadly, the features of the embodiments herein in order that the detailed description that follows may be better understood. The objects disclosed above are not intended to determine the scope of the claimed subject matter and are not to be construed as limiting of the embodiments herein. Additional objects, features, and advantages of the embodiments herein are disclosed below. The objects disclosed above, which are believed to be characteristic of the embodiments herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The embodiments herein disclose a system and a method for automatically generating an avatar with pronounced features by cartoonizing a user's real appearance and characteristics from a user's photographic image in real time with minimal user intervention. The embodiments herein disclose a system and method for automatically predicting the user's face tone from an input image and merges the predicted face tone with graphically pronounced features of the user to generate the avatar.

The system and the method disclosed herein employ an avatar generation engine and at least one processor for automatically generating an avatar with pronounced features in real time. The avatar generation engine comprises one or more modules defining computer program instructions, which when executed by the processor(s), cause the processor(s) to automatically generate an avatar with pronounced features in real time. The avatar generation engine receives an input image representing a target object, such as, a person or a user, from a storage location, such as, a user device. The avatar generation engine segments the input image for extracting a frontal image of a frontal component from the input image. The frontal component comprises a primary component, for example, a face component, and a secondary component, for example, a hair component. The avatar generation engine segments the frontal image for extracting and separating a primary image of the primary component and a secondary image of the secondary component from the frontal image. The avatar generation engine normalizes and processes the separated primary image for extracting one or more feature images corresponding to one or more of a plurality of features indicating distinct characteristics of the target object. The avatar generation engine processes the extracted feature image(s) for graphically pronouncing the feature(s) of the target object.

The avatar generation engine executes a prediction model for automatically predicting a tone of the primary component from the frontal image. The avatar generation engine generates a primary canvas comprising the predicted tone of the primary component. The avatar generation engine generates a primary graphical image excluding the secondary component by merging the primary canvas with the graphically pronounced features of the target object. According to an embodiment herein, the avatar generation engine enhances the primary graphical image by adding one or more aesthetic elements to the primary graphical image. The avatar generation engine generates a secondary graphical image of the excluded secondary component. The avatar generation engine generates the avatar with pronounced features by merging the primary graphical image with the secondary graphical image. The embodiments herein disclose a system and method for generating avatars that are cartoonized versions of users for different image resolutions, lighting conditions, and user positions, face angles, stances, and poses. The generated avatars are cartoonized versions of the users that substantially resemble the users' own appearances.

According to an embodiment herein, the systems comprise circuitry and/or programming for effecting the embodiments herein. According to an embodiment herein, the circuitry and/or programming are any combination of hardware, software, and/or firmware configured to implement the embodiments herein depending upon the design choices of a system designer. According to an embodiment herein, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments herein are shown in the drawings. However, the embodiments herein are not limited to the specific methods and components disclosed herein. The description of a method step or a component referenced by a numeral in a drawing is applicable to the description of that method step or component shown by that same numeral in any subsequent drawing herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

Figure 1:
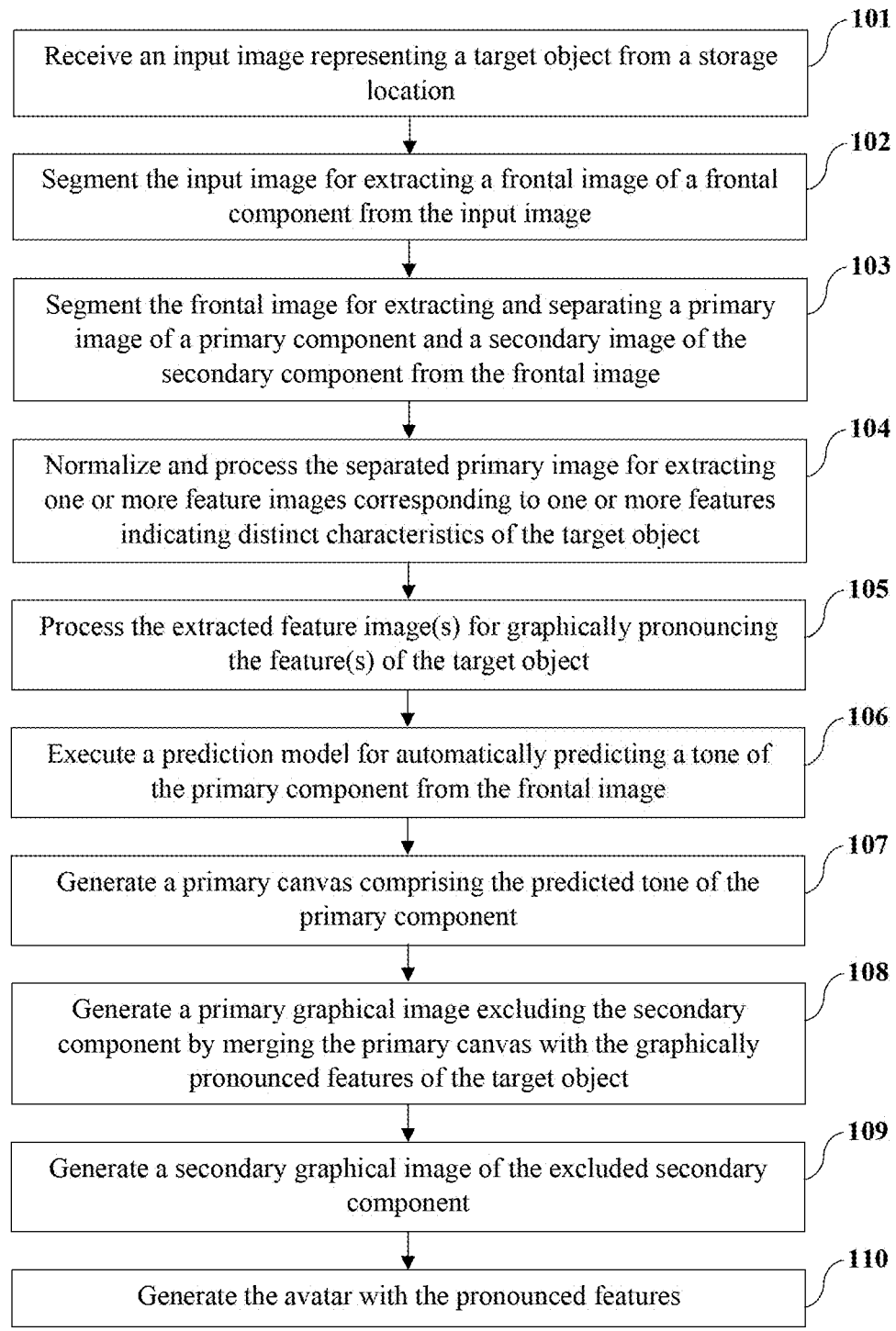
FIG. 1 illustrates a flowchart explaining the process steps involved in a method for automatically generating an avatar with pronounced features in real time, according to an embodiment herein.

FIG. 1 illustrates a flowchart for a method of automatically generating an avatar with pronounced features in real time, according to an embodiment herein. The method disclosed herein employs an avatar generation engine and at least one processor for automatically generating an avatar with pronounced features in real time. According to an embodiment herein, the avatar generation engine comprises one or more modules defining computer program instructions, which when executed by the processor(s), cause the processor(s) to automatically generate an avatar with pronounced features in real time. The avatar generation engine receives 101 an input image representing a target object, from a storage location, for example, a user device. As used herein, "target object" refers to a subject, for example, a person or a user, whose photographic image is to be cartoonized into an avatar. The input image is a photographic image of the target object. Users may input photographic images of themselves in different positions, face angles, stances, and poses into the avatar generation engine.

The avatar generation engine segments 102 the input image for extracting a frontal image of a frontal component from the input image. The frontal component comprises a primary component, such as, a face component, and a secondary component, such as, a hair component. According to an embodiment herein, the avatar generation engine performs a face segmentation on the input image to extract the user's face with hair from a background of the input image as disclosed in the detailed description of FIG. 2. The avatar generation engine segments 103 the frontal image for extracting and separating a primary image of the primary component and a secondary image of the secondary component from the frontal image. According to an embodiment herein, the avatar generation engine performs hair segmentation on the frontal image to extract a hair portion of the user's face and separates the face image from the hair image as disclosed in the detailed description of FIG. 2. The avatar generation engine normalizes and processes 104 the separated primary image for extracting one or more feature images corresponding to one or more of a plurality of features indicating distinct characteristics of the target object. The features comprise, eyes. a nose. lips, facial lines, distinguishing marks such as birth marks or beauty spots, facial hair such as a beard or a mustache, eyeglasses, etc. The avatar generation engine processes 105 the extracted feature image(s) for graphically pronouncing the features of the target object.

The avatar generation engine executes 106 a prediction model for automatically predicting a tone based on dynamic face tone calculation, such as, a skin tone, of the primary component from the frontal image. The avatar generation engine generates 107 a primary canvas comprising the predicted tone of the primary component. The avatar generation engine generates 108 a primary graphical image excluding the secondary component by merging the primary canvas with the graphically pronounced features of the target object. According to an embodiment herein, the avatar generation engine enhances the primary graphical image by adding one or more aesthetic elements to the primary graphical image. The avatar generation engine generates 109 a secondary graphical image of the excluded secondary component. The avatar generation engine generates 110 the avatar with pronounced features by merging the primary graphical image with the secondary graphical image. According to an embodiment herein, a method involves using the avatar generation engine to generate avatars that are cartoonized versions of users for different image resolutions, lighting conditions, and user positions, face angles, stances, and poses. The generated avatars are cartoonized versions of the users that substantially resemble the users' own appearances.

Figure 2:
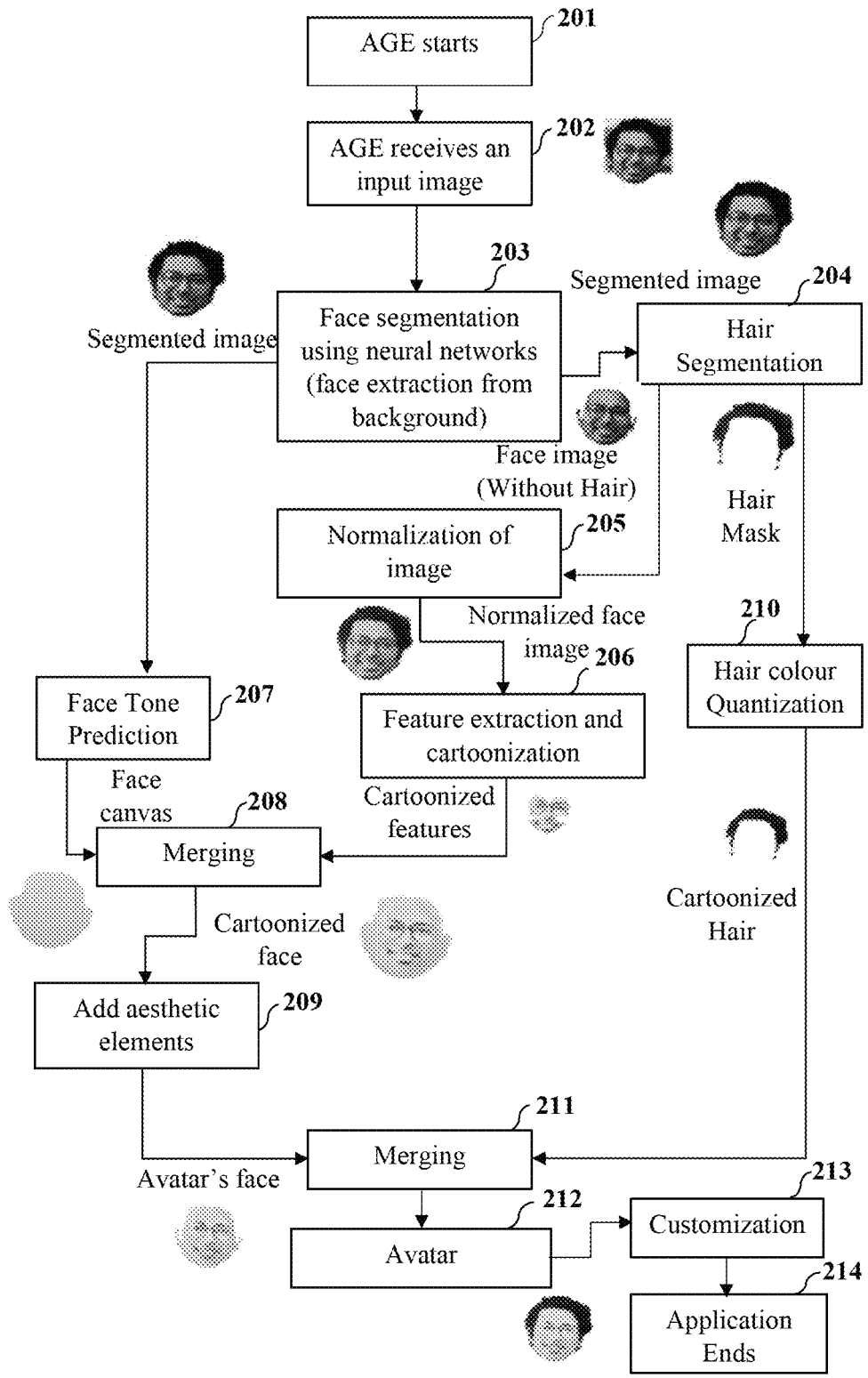
FIG. 2 illustrates a flowchart explaining the process steps involved in a method for automatically generating an avatar with pronounced features in real time with minimal user intervention, indicating a cartoonization of a user's real appearance and characteristics from a user's photographic image, according to an embodiment herein.

FIG. 2 illustrates a flowchart for a method of automatically generating an avatar with pronounced features in real time with minimal user intervention, showing cartoonization of a user's real appearance and characteristics from a user's photographic image, according to an embodiment herein. The method disclosed herein involves using the avatar generation engine (AGE) for cartoonizing the user's real appearance and characteristics from a user's photographic image. The method comprises the steps of enabling the user to invoke the avatar generation engine by clicking on an application icon from a device application launcher of a user device. On invoking the avatar generation engine, the avatar generation engine starts 201 and receives 202 an input image from a storage location, such as, a camera storage device, a cloud storage platform, a gallery of stored images on the user device, etc. The avatar generation engine performs face segmentation 203 on the input image. According to an embodiment herein, the avatar generation engine executes a model trained on user images, using feature extractors and neural networks such as MobileNetV2 and U-Net. According to an embodiment herein, the training data set for training the model for segmentation is curated through one or more third party agencies. Further, the training data set comprises face images of people and a binary facemask for the same image with same resolution. The image pixels have face region masked by black pixels and rest of the image region marked by white pixels. For each image two face masks are curated wherein, one of the face masks marking the entire face with hair and the other face mask marking a face without hair. According to an embodiment herein, an objective of data curation is to get the training data for training our neural net models to return both face masks with and without hair for any input face image. Accordingly, at step 203, the avatar generation engine extracts an image of a face including hair and an image of face excluding hair from a background of the input image using the model. The output of step 203 is a segmented image of the face with hair of the user. According to one embodiment herein, the avatar generation engine removes ear region from the image of the face excluding hairs.

At step 204, the avatar generation engine performs hair segmentation on the segmented image. The avatar generation engine executes a model trained on user images, using feature extractors and neural networks such as MobileNetV2 and U-Net. At step 204, the avatar generation engine extracts a hair portion, from the segmented face image including hair using the model and separates the image of the hair from the face image. The hair portion is referred to as a secondary component. According to one embodiment herein, the hair portion or the secondary component includes ear region based on removal of ear region from the image of face without hairs. In one example, the addition of the ear region to the hair portion is carried out based on at least one of dlib feature points which further includes interpolation and triangulation, edge detection, contour drawing and bitwise image operations. The output of step 204 is a segmented image of the hair portion. Further the method for segmentation of a frontal image to extract a primary image of the primary component and a secondary image of the secondary component is described in FIG. 3.

Figure 3:
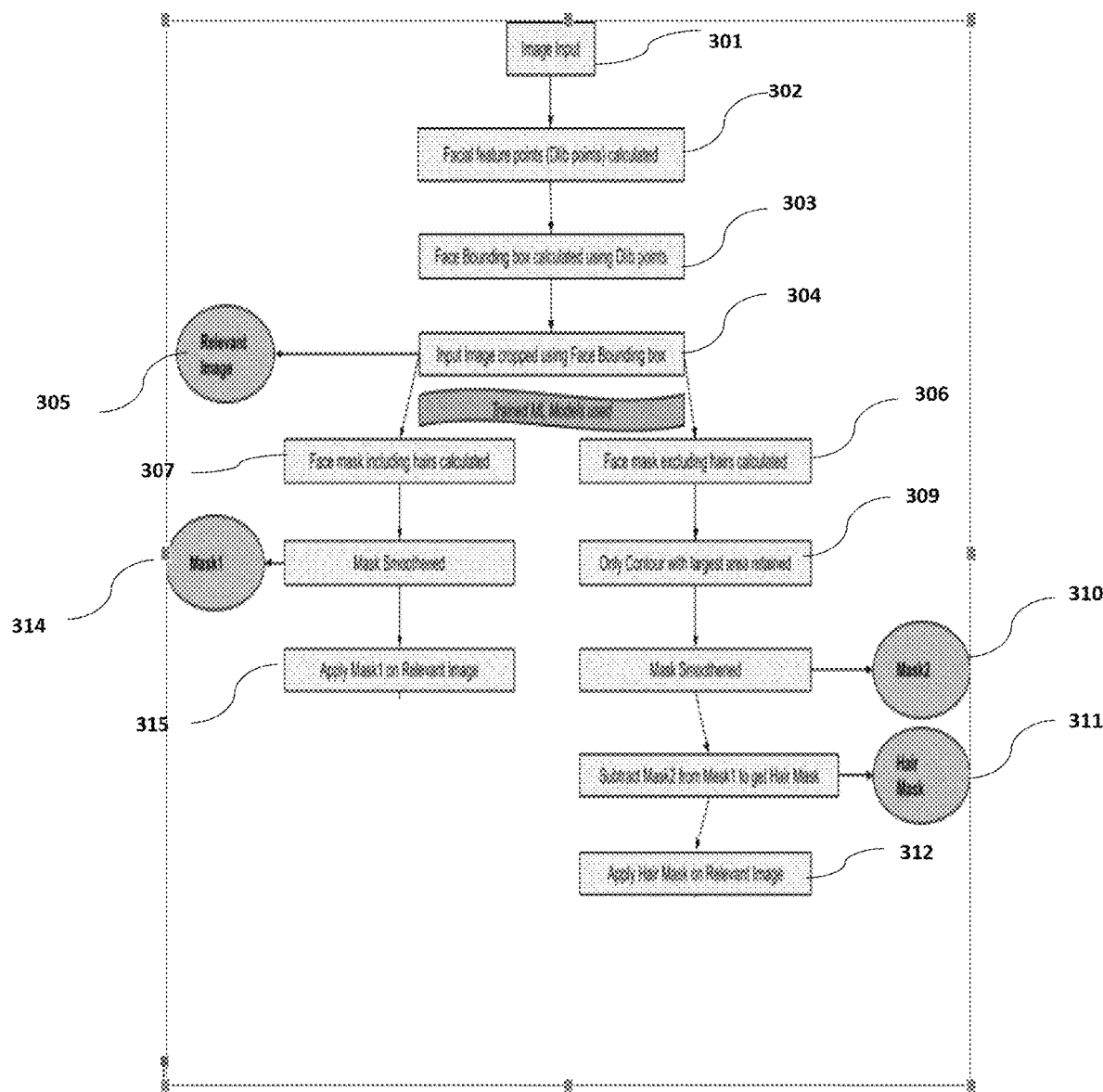
FIG. 3 illustrates a flowchart explaining the process steps involved in method for segmenting a frontal image to extract a face image with hair portion, and a hair portion, according to an embodiment herein.

FIG. 3 illustrates a flow chart explaining a method for segmentation of a frontal image to extract face image with hair portion and the hair portion, according to an embodiment herein. With respect to FIG. 3, the avatar generation engine is trained with a training set based on Deep Learning model for face segmentation (hair portion included) based on Encoder-Decoder architecture with Mobilenet encoder and u-net decoder. According to an embodiment herein, the training set for the model consists of image pairs of 224×224×3 color image and corresponding binary face image (with hair portion included) where face(with hair portion included) is marked as black and the rest of the image region as white. On invoking the avatar generation engine, the avatar generation engine starts and receives an input image 301 from a storage location as the input and outputs a binary facemask with hair included, wherein the face (with hair portion included) is marked as black and the rest of the image region as white. According to one embodiment herein, the avatar generation engine is trained with a training set based on Deep Learning model for face segmentation (hair portion excluded) based on Encoder-Decoder architecture with Mobilenet encoder and u-net decoder. According to an embodiment herein, the training set for the model consists of image pairs of 224×224×3 into color image and corresponding binary face image (with hair portion excluded) where face (with hair portion excluded) is marked as black and the rest of the image region as white. On invoking the avatar generation engine, the avatar generation engine starts and receives an input image 301 from a storage location as the input and outputs a binary facemask with hair excluded, wherein the face (with hair portion excluded) is marked as black and the rest of the image region as white which is described further in steps 306 and 307.

According to one embodiment herein, the avatar generation engine is configured to extract facial feature point, that is 68 Dlib points on the face region 302 of the image from the Input Image. The avatar generation engine calculates bounding box around the face region 303 based on the dlib points and the box with face image is cropped from the original image 304. At this stage, a relevant image 305 is extracted which is also referred as cropped image. The cropped image is given as input to the two deep learning models trained, as explained earlier, to extract two raw face masks. A facemask included with hair portion is calculated 307. The raw face mask with hair portion is smoothened to get a smooth mask (or mask 1) 314. According to an embodiment herein, the raw face mask with hair portion is smoothened using Gaussian blurring and thresholding to give a smooth face mask including hair portion 314. According to an embodiment herein, the facemask smoothening process includes smoothening of the rough edges of the raw facemask extracted from the encoder-decoder (mobilenet-unet) model which follows at least one or more of Gaussian smoothening, Image Intensity Rescaling and Image thresholding, another iteration of Gaussian smoothening, another Image Intensity Rescaling and Image thresholding. An image is extracted by applying the smooth face mask including hair portion to the cropped image 315. Another facemask with hair portion excluded is calculated 306. In the facemask with hair portion excluded, the contour with largest area is selected to extract only the face without hair portion and other contours are rejected 309. Further, mask is smoothened based on, Gaussian blurring and thresholding to give a smooth face mask excluding hair portion (Mask 2) 310. Further, the method includes a step of subtracting 'smooth face mask excluding hair portion' from 'smooth face mask including hair portion' giving the hair mask 311. The method includes a further step of applying 'hair mask' to the cropped image 312 and thus returning an image of the hair portion of the face image.

With respect to FIG. 2, at step 205, the avatar generation engine normalizes the face image without the hair. According to one embodiment herein, the avatar generation engine normalizes the face image with hair and normalizes the image for luminosity based on image thresholding, probabilistic normalization with truncation and gamma correction of intensities. The avatar generation engine expands a range of pixel intensity values in the face image, which results in dimmed images becoming brighter and brighter images becoming dark. The output of step 205 is a normalized face image with more information.

The avatar generation engine performs a feature reduction process on the normalized face image for identifying distinct features of the face and removing other features. After feature reduction, the avatar generation engine extracts on step 206 the distinct features from the face image using adaptive thresholding and interpolated facial feature points calculated using 68 dlib points. The avatar generation engine processes the face features through a series of blending operations such as colour burn, multiply blending, etc., and in an embodiment, darkens the features using logarithmic translation and gamma correction. The output of step 206 comprises cartoonized features of the face.

Figure 4:
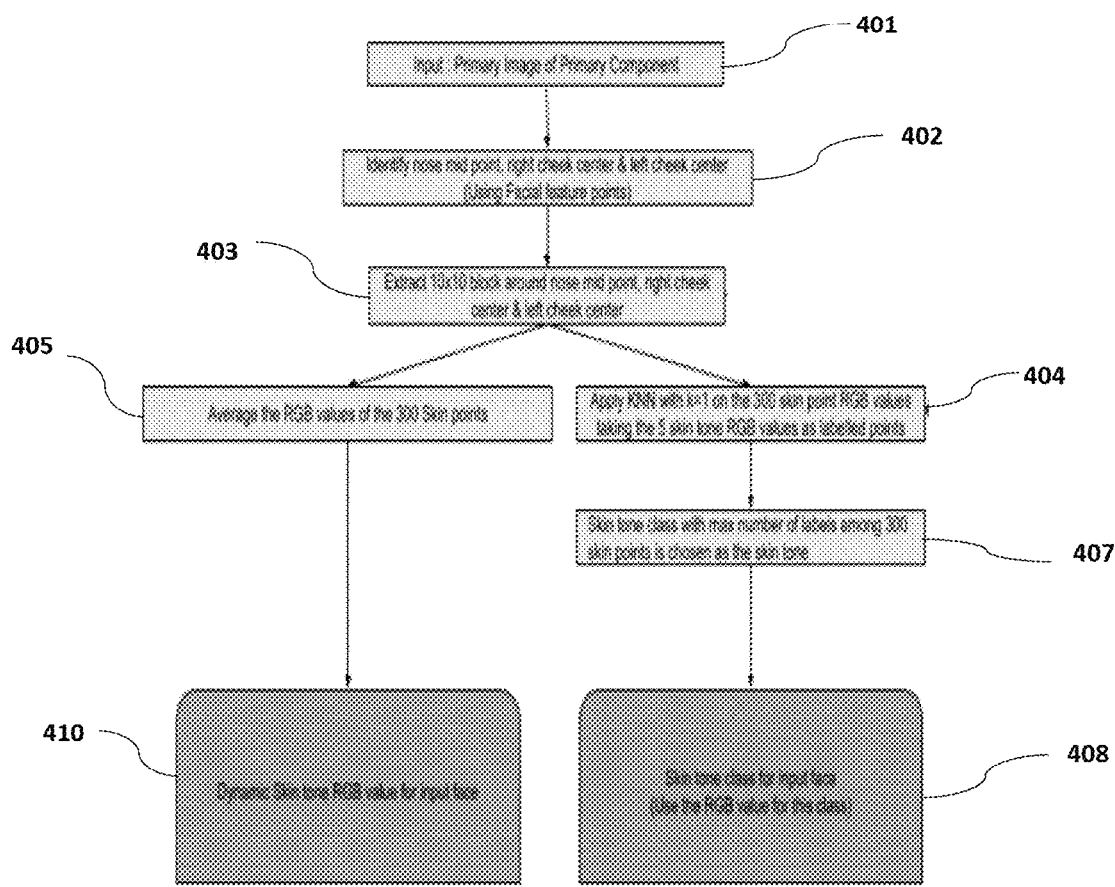
FIG. 4 illustrates a flowchart for a method of predicting models to predict skin tone of a target object (user), according to an embodiment herein.

At step 207, the avatar generation engine automatically predicts a face tone of the user, for example, using a k-nearest neighbors (k-NN) model. Using the k-NN model, the avatar generation engine selects a skin tone that is nearest to the face tone of the user's face from a template of a predetermined number of skin tones, for example, five skin tones. The avatar generation engine generates a face canvas with a face tone that changes from light to dark to mimic the real face of the user. The face canvas is of the shape of the user's face without hair. According to an embodiment, the avatar generation engine generates the face canvas by extracting only the face without the hair using the hair mask by inverting the hair mask and using this to black out the hair portion. The method of prediction models to predict skin tone of the user is further explained in FIG. 4. Accordingly, FIG. 4 illustrates a flow chart for a method of predicting models to predict skin tone of the user, according to an embodiment herein The method includes a step of identifying primary image of the primary component using, the face segmentation logic at step 401. The avatar generation engine identifies nose mid-point, right cheek center and left cheek center in the user image at step 402. According to one embodiment herein, after identifying the mid-point of the nose, center of left and right cheek, the avatar generation engine extracts three 10×10 skin regions on the right cheek, left cheek and middle of nose in primary image of the primary component based on the dlib points at step 403. Further, the avatar generation engine extracts RGB values of these 300 skin points. At 404, for the k-NN algorithm, the avatar generation engine uses the RGB (Red, Green, and Blue) value of the 5 skin tone values as known labels and apply KNN algorithm on the RGB values of the 300 skin points identified previously with k=1. Each skin point is assigned with a skin tone which has least distance to it, taking RGB value as the coordinates. The skin tone which has maximum number of skin points is chosen as the Face Tone at step 407. Based on the RGB value, the skin tone class for the input face 408 and skin tone identification is executed. According to one embodiment herein, an average RGB value out of the 300 skin points is selected 405. and the avatar generation engine uses average value as the face tone for the input face 410.

With respect to the FIG. 2, at step 208, the avatar generation engine merges the cartoonized features and the face canvas and generates a graphical image of a cartoonized face without hair. According to an embodiment herein, at step 209, the avatar generation engine adds aesthetical elements, for example, blush, lip colour, etc., to the graphical image of the cartoonized face to enhance the aesthetics of the graphical image. According to one embodiment, aesthetical elements are processed in a Graphical Processing Unit (GPU) in combination with CPU to add based on gender of the user which includes different color addition, alpha blending and gamma correction techniques. According to an embodiment herein, aesthetic elements for male includes, but not limited to, beard, moustache, sunglasses, cigars, headgear, and the like, while the aesthetic elements for female includes, but not limited to, lip colour, sunglasses, eyebrows, maskara, and the like. According to an embodiment herein, aesthetic elements are based on the age or the age group of the user and wherein there are separate aesthetic elements for child users, men and women of different age groups and the like. Further, at 209, the avatar generation engine blends the processed lips and teeth again with the cartoonized image and soften the edges to get avatar's image. According to an embodiment herein, a cartoon template is considered for eyes and mouth and triangulation warp to match the shape of the extracted user face features. Further, multiply blend with the avatar's image to produce final output image and make eyes black & white and more prominent using for example, at least one image processing algorithms irrespective of gender. At step 210, the avatar generation engine generates cartoonized hair or a colour quantized hair first by extracting the secondary component from the input image and then by converting the hair portion of the face to a cartoon form. In one embodiment, the avatar generation engine quantizes the segmented image using multiple image thresholding and bitwise operations to produce cartoonized secondary image or cartoonized hair. At step 211, the avatar generation engine merges the cartoonized hair and the cartoonized face to generate a cartoonized head or the avatar 212 with pronounced features based on normal blending and smoothening of the edges and adding a border around the avatar face. In an embodiment, the avatar generation engine performs customization 213 of the avatar. For example, the avatar generation engine smoothens the blending by blurring the edges where blending occurs using a Gaussian function referred to as a Gaussian blur. The avatar generation engine adds borders to the avatar by determining contours of the cartoon head or avatar and then drawing borders at the contours. According to an embodiment herein, the avatar generation engine adds shadows on the avatar to make the avatar more realistic. According to one embodiment herein, to generate the graphical image of the cartoonized face without hair, the avatar generation engine extracts dlib feature points for the input image and extracts the face image without hairs from the segmented image. Further, the avatar generation engine applies image sharpening process on the face image and apply color burn image blending operation on the segmented image. According to one embodiment herein, the color burn is applied on each of the face tone canvas and the face image. The avatar generation engine applies multiply image blending operation on the face image to get the normalized face image. Furthermore, the avatar generation engine darkens the face part of normalized face image with some pixel thickness to generate cartoonized features, and wherein the normalized face image excludes the boundary. The avatar generation engine extracts facial feature from the segmented image such as, but not limited to, eyes, mouth, nose, and eyebrows. The avatar generation engine applies seamless cloning to merge extracted facial features on face tone canvas to produce avatar's face. Further, a gamma correction is applied on the avatar's face and mix avatar's face and its corresponding gamma corrected version to generate the end image, and wherein the mixing of the avatar's face and its corresponding gamma corrected version is based on adaptive thresholding and masking. According to an embodiment herein, the avatar generation engine customizes the avatar based on user preferences and selections entered by the user via a graphical user interface (GUI) rendered by the avatar generation engine on the user device. According to an embodiment herein, the user can add wigs and other props such as glasses to the avatar via the GUI on the user device. After generation and customization of the avatar, the process ends 214 and the avatar generation engine stores the avatar for use, for example, in stories, as a bitmap image such as a graphics interchange format (gif) image, as a sticker, etc.

Figure 5A:
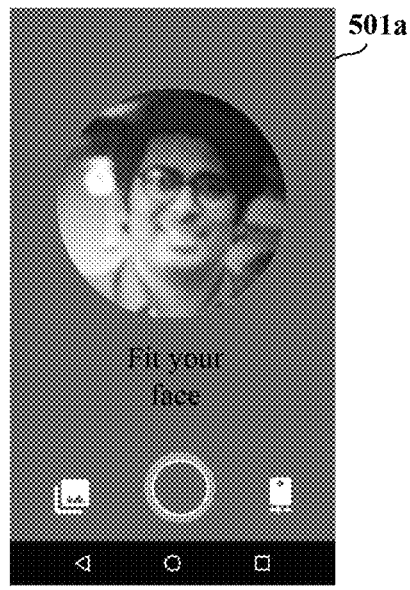
FIGS. 5A-5D illustrate screenshots of graphical user interfaces provided by the system for automatically generating an avatar with pronounced features in real time, according to an embodiment herein.
Figure 5B:
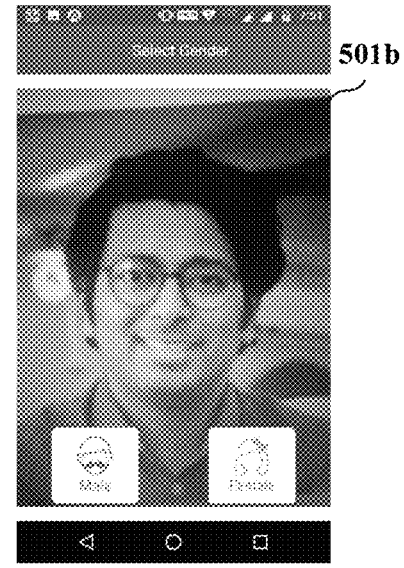
Figure 5C:
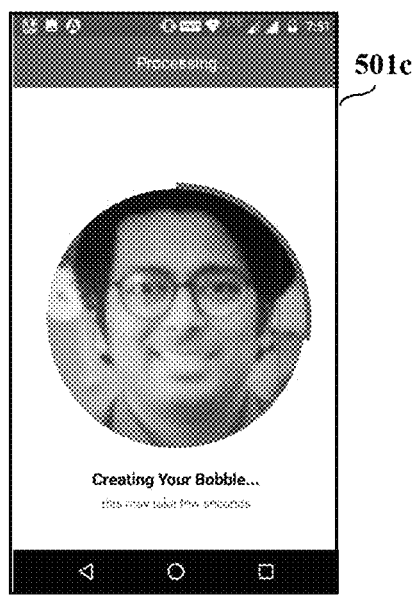
Figure 5D:
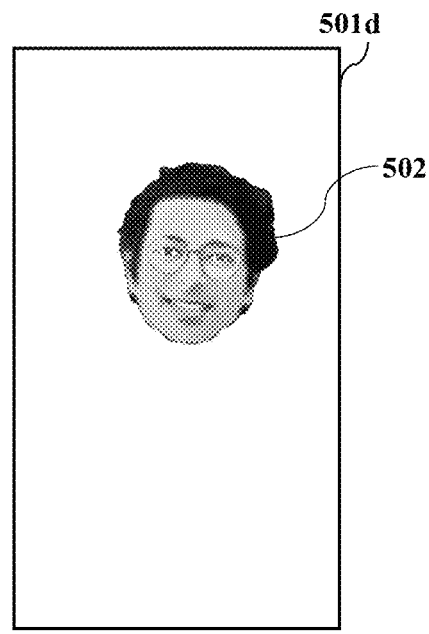

FIGS. 5A-5D illustrate screenshots of graphical user interfaces (GUIs) 501a, 501b, 501c, and 501d provided by the system for automatically generating an avatar with pronounced features in real time, according to an embodiment herein. With respect to FIGS. 5A-5D, the avatar generation engine is configured as an application (app) deployable on a user device. After installing the application on the user device, the user can launch the application by clicking on an application icon from a device application launcher of the user device. When the user launches the application, the avatar generation engine renders a GUI 501a on the user device, requesting the user to provide an image as illustrated in FIG. 5A. The avatar generation engine receives an input image from a storage location, such as a camera storage device, a cloud storage platform, a gallery of stored images on the user device, etc. The avatar generation engine then requests the user to select a gender on the GUI 501b as illustrated in FIG. 5B. The avatar generation engine receives data associated with the gender selected by the user via the GUI 501b. The avatar generation engine processes the input image and the received data and indicates the processing on the GUI 501c as illustrated in FIG. 5C. The processing time involved in automatically generating an avatar with pronounced features varies depending on the computing power of the user device or other computing device that executes the avatar generation engine. According to an embodiment herein, the avatar generation engine performs cartoonization of the input image and automatically generates an avatar 502 with pronounced features based on the gender of the user. For example, for the female gender, the avatar generation engine generates a female avatar with aesthetic elements or makeup elements such as blush, lipstick, etc. The avatar generation engine displays the automatically generated avatar 502 on the GUI 501d as illustrated in FIG. 5D.

Figure 6:
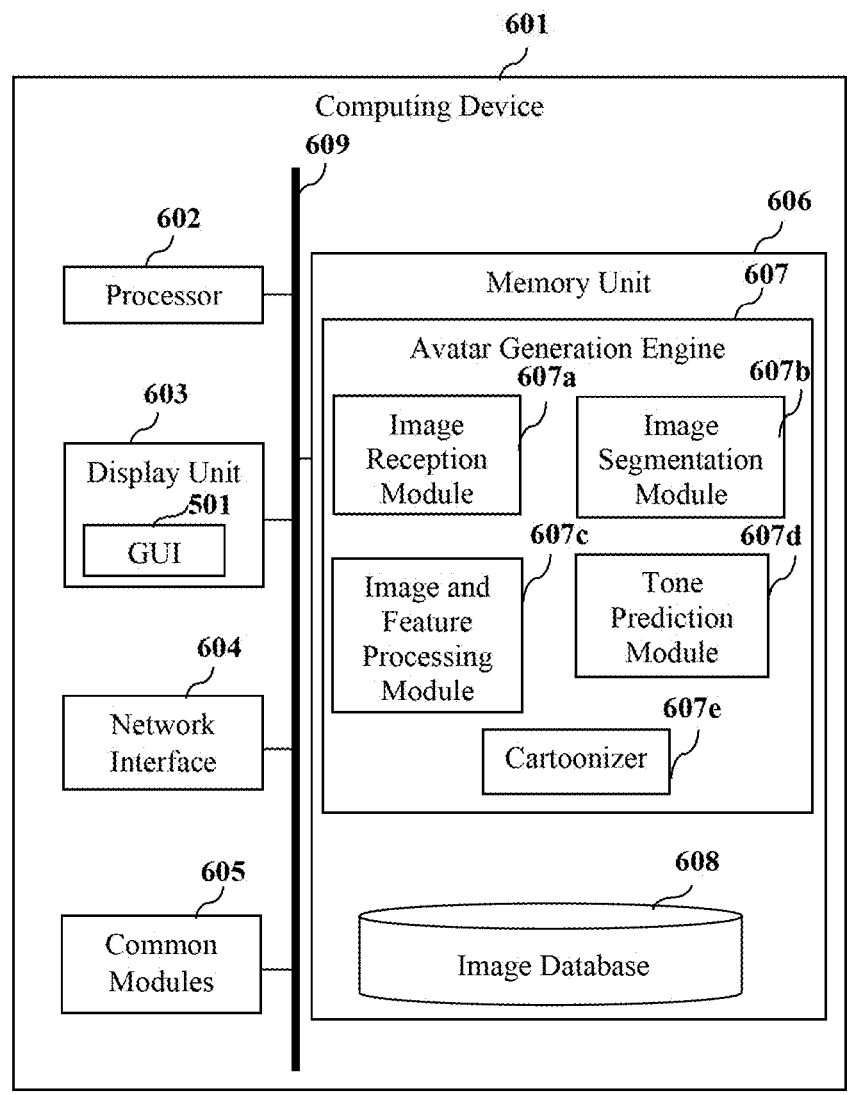
FIG. 6 illustrates a block diagram a system for automatically generating an avatar with pronounced features in real time, using an avatar generation engine in a computing device, according to an embodiment herein.

FIG. 6 illustrates a block diagram of a system comprising the avatar generation engine 607 in a computing device 601 for automatically generating an avatar with pronounced features in real time, according to an embodiment herein. The computing device 601 is an electronic device, such as any one of a personal computer, a tablet computing device, a mobile computer, a smart phone, a portable computing device, a laptop, a wearable computing device such as smart glasses, smart watches, etc., a touch centric device, a workstation, a server, a client device, a portable electronic device, a network-enabled computing device, an interactive network-enabled communication device, a gaming device, an image capture device, a web browser, a portable media player, a video recorder, any other suitable computing equipment or combinations of multiple pieces of computing equipment.

The various aspects of the embodiments herein may be embodied as a system, a method, or a non-transitory, computer-readable storage medium having one or more computer-readable program codes stored thereon. Accordingly, the embodiments herein may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". As used herein, "non-transitory, computer-readable storage medium" refers to all computer-readable storage media that contains and stores computer programs and data. Examples of the computer-readable media comprise hard drives, solid state drives, optical discs or magnetic disks, memory chips, a read-only memory (ROM), a register memory, a processor cache, a random-access memory (RAM), etc.

According to an embodiment herein, the avatar generation engine 607 is implemented using programmed and purposeful hardware of the computing device 601. According to an embodiment herein, the avatar generation engine 607 is accessible to users, for example, through a broad spectrum of technologies and user devices such as smart phones, tablet computing devices, endpoint devices, etc., with access to a network, such as, a short-range network or a long-range network. The network is, any one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements Zig-Bee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

As illustrated in FIG. 6, the computing device 601 comprises at least one processor 602 and a non-transitory, computer-readable storage medium, for example, a memory unit 606, for storing computer program instructions defined by modules, for example, 607a, 607b, 607c, 607d, and 607e of the avatar generation engine 607. The memory unit 606 is used for storing program instructions, applications, and data. The memory unit 606 is, for example, a random-access memory (RAM) or another type of dynamic storage device that stores information and instructions for execution by the processor 602. The memory unit 606 also stores temporary variables and other intermediate information used during execution of the instructions by the processor 602. The computing device 601 further comprises read only memories (ROMs) or other types of static storage devices that store static information and instructions for execution by the processor 602. According to an embodiment herein, the modules, for example, 607a, 607b, 607c, 607d, and 607e of the avatar generation engine 607 are stored in the memory unit 606 as illustrated in FIG. 6.

The processor 602 is operably and communicatively coupled to the memory unit 606 for executing the computer program instructions defined by the modules, for example, 607a, 607b, 607c, 607d, and 607e of the avatar generation engine 607. The processor 602 refers to any one or more microprocessors, graphical processing unit (GPU), central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. According to an embodiment herein, the processor 602 is implemented as a processor set comprising, a programmed microprocessor and a math or graphics co-processor. The avatar generation engine 607 is not limited to employing the processor 602. According to an embodiment herein, the avatar generation engine 607 employs controllers or microcontrollers. According to an embodiment herein, the GPU in combination with the processor 602 is configured to carry out image blending, masking, gray scaling the image and gamma correction and thus reduce the load on the CPU of the device giving optimized performance. According to an embodiment herein, the GPU in combination with the processor 602 is configured to normalize and process the separated primary image for extracting one or more feature images corresponding to one or more features indicating distinct characteristics of the target object and process the extracted feature image(s) for graphically pronouncing the feature(s) of the target object. Further, the GPU in combination with the processor 602 is configured to be used in execution of a prediction model that includes blending of images based on operations such as color burn, multiply blending, etc, and also image extraction based on a mask may also be executed using GPU.

As illustrated in FIG. 6, the computing device 601 further comprises a data bus 609, a display unit 603, a network interface 604, and common modules 605. The data bus 609 permits communications between the modules, for example, 602, 603, 604, 605, and 606. The display unit 603, via a graphical user interface (GUI) 501, displays information, display interfaces, media content, user interface elements such as checkboxes, input text fields, etc., for allowing a user to invoke and execute the avatar generation engine 607, input a photographic image for generation of an avatar, select a gender for the avatar, select aesthetic elements to enhance the avatar, etc. The GUI 501 comprises, online web interfaces, web-based downloadable application interfaces, mobile-based downloadable application interfaces, etc.

The network interface 604 connects the avatar generation engine 607 to the network. According to an embodiment herein, the network interface 604 is provided as an interface card also referred to as a line card. The network interface 604 is, any one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The common modules 605 of the computing device 601 comprise, input/output (I/O) controllers, input devices, output devices, fixed media drives such as hard drives, removable media drives for receiving removable media, etc. Computer applications and programs are used for operating the avatar generation engine 607. The programs are loaded onto fixed media drives and into the memory unit 606 via the removable media drives. According to an embodiment herein, the computer applications and programs are loaded into the memory unit 606 directly via the network.

According to an embodiment herein, the avatar generation engine 607 is configured as an artificial intelligence (AI) engine comprising multiple modules defining computer program instructions, which when executed by the processor 602, cause the processor 602 to automatically generate an avatar with pronounced features in real time. According to an embodiment herein, the modules of the avatar generation engine 607 comprise an image reception module 607a, an image segmentation module 607b, an image and feature processing module 607c, a tone prediction module 607d, and a cartoonizer 607e. The image reception module 607a receives an input image representing a target object from a storage location, for example, an image database 608.

The image segmentation module 607b segments the input image for extracting a frontal image of a frontal component from the input image. The frontal component comprises a primary component, for example, a face component, and a secondary component, for example, a hair component. According to an embodiment herein, the image segmentation module 607b performs face segmentation on the input image to extract the user's face with hair from a background of the input image as disclosed in the detailed description of FIG. 3. The image segmentation module 607b segments the frontal image for extracting and separating a primary image of the primary component and a secondary image of the secondary component from the frontal image. According to an embodiment herein, the image segmentation module 607b performs hair segmentation on the frontal image to extract a hair portion of the user's face and separates the face image from the hair image as disclosed in the detailed description of FIG. 3. The image and feature processing module 607c normalizes and processes the separated primary image for extracting one or more feature images corresponding to one or more of a plurality of features indicating distinct characteristics of the target object. The cartoonizer 607e, in communication with the image and feature processing module 607c, processes the extracted feature image(s) for graphically pronouncing the features of the target object as disclosed in the detailed description of FIG. 2.

The tone prediction module 607d executes a prediction model, for example, k-nearest neighbors (k-NN) model, for automatically predicting a tone based on dynamic face tone calculation, for example, a skin tone, of the primary component from the frontal image as disclosed in the detailed description of FIG. 4. The cartoonizer 607e, in communication with the tone prediction module 607d, generates a primary canvas comprising the predicted tone of the primary component based on dynamic face tone calculation. The cartoonizer 607e generates a primary graphical image excluding the secondary component by merging the primary canvas with the graphically pronounced features of the target object. According to an embodiment herein, the cartoonizer 607e enhances the primary graphical image by adding one or more aesthetic elements to the primary graphical image. The cartoonizer 607e generates a secondary graphical image of the excluded secondary component, as disclosed in the detailed description of FIG. 2. The cartoonizer 607e generates the avatar with pronounced features by merging the primary graphical image with the secondary graphical image as disclosed in the detailed description of FIG. 2.

The image reception module 607a, the image segmentation module 607b, the image and feature processing module 607c, the tone prediction module 607d, and the cartoonizer 607e are disclosed above as software executed by the processor 602. According to an embodiment herein, the modules, 607a, 607b, 607c, 607d, and 607e of the avatar generation engine 607 are implemented completely in hardware. According to an embodiment herein, the modules, 607a, 607b, 607c, 607d, and 607e of the avatar generation engine 607 are implemented by logic circuits to carry out their respective functions disclosed above. According to an embodiment herein, the avatar generation engine 607 is also implemented as a combination of hardware and software including one or more processors, that are used to implement the modules, 607a, 607b, 607c, 607d, and 607e of the avatar generation engine 607. The processor 602 retrieves instructions defined by the image reception module 607a, the image segmentation module 607b, the image and feature processing module 607c, the tone prediction module 607d, and the cartoonizer 607e from the memory unit 606 for performing respective functions disclosed above.

For purposes of illustration, the detailed description refers to the modules, for example, 607a, 607b, 607c, 607d, and 607e of the avatar generation engine 607 being run locally on a single computer system. However the scope of the method and the system disclosed herein is not limited to the modules, 607a, 607b, 607c, 607d, and 607e of the avatar generation engine 607 that are run locally on a single computer system via the operating system and the processor 602, but are extended to run remotely over the network by employing a web browser and a remote server, a mobile phone, or other electronic devices. According to an embodiment herein, one or more portions of the system disclosed herein are distributed across one or more computer systems (not shown) coupled to the network.

The non-transitory, computer-readable storage medium disclosed herein stores computer program instructions executable by the processor 602 for automatically generating an avatar with pronounced features in real time. The computer program instructions implement the processes of various embodiments disclosed above and perform additional steps that are required and contemplated for automatically generating an avatar with pronounced features in real time. When the computer program instructions are executed by the processor 602, the computer program instructions cause the processor 602 to perform the steps of the method for automatically generating an avatar with pronounced features in real time as disclosed above. According to an embodiment herein, a single piece of computer program code comprising computer program instructions performs one or more steps of the method disclosed above. The processor 602 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language. In an embodiment, the computer program codes or software programs are stored on or in one or more mediums as object code. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

The method and the system disclosed herein cartoonize a user's face in real time based on an input photographic image of the user's real face. The method and the system disclosed herein generate a cartoon version of the user's face which is uniform and synonymous with the real face and requires minimal input from the user. According to an embodiment herein, the face tone is automatically predicted. In the avatar automatically generated by the system disclosed herein, the facial features are more pronounced, unnecessary face lines are removed, and the overall cartoon head generated is substantially cartoonized with enhanced aesthetics. According to an embodiment herein, the method and the system disclosed herein enhance digital graphical images such as the avatars. The generated cartoon head is used to create custom stickers and stories which, in an embodiment, is mapped with brands selling a product used in the sticker or the story. For example, in a story of eating out with family, the logo of a brand associated with the food industry can be integrated into one or more avatars. The association of brands with the avatars used in stories or stickers allows users who share the branded stickers or stories through applications deployed on user devices to serve as brand ambassadors. The method and the system disclosed herein allow creation of an avatar that is substantially similar to the user's appearance and aesthetically pleasing to a viewer. The method and the system disclosed herein utilizes the GPU in combination with a processor to analyze and process data, which includes image blending, masking, gray scaling the image and gamma correction and thus reduce the load on the CPU of the device giving optimized performance along with generating avatars for different image resolutions, lighting conditions, and user positions, face angles, stances, and poses in a time-efficient manner.

The foregoing examples and illustrative implementations of various embodiments have been provided merely for explanation and are in no way to be construed as limiting of the embodiments herein. While the embodiments herein has been described with reference to various embodiments, illustrative implementations, drawings, and techniques, it is understood that the words, which have been used herein, are words of description and illustration, rather than words of limitation. Further, although the embodiments herein has been described herein with reference to particular means, materials, embodiments, techniques, and implementations, the embodiments herein is not intended to be limited to the particulars disclosed herein; rather, the embodiments herein extends to all functionally equivalent structures, methods and uses, such as are within the scope of the appended claims. It will be understood by those skilled in the art, having the benefit of the teachings of this specification, that the embodiments herein is capable of modifications and other embodiments may be effected and changes may be made thereto, without departing from the scope and spirit of the embodiments herein.

What is claimed is:

1. A system for automatic generation of an avatar of a user, the system comprising:
   an electronic device (601) comprising an input device, at least one processor (602), a memory unit (606) operably and communicatively coupled to the at least one processor (602), and a display unit (603); and
   an avatar generation engine (607) operably coupled to the at least one processor (602), and an application deployed on the electronic device (601), wherein the avatar generation engine (607) is configured to:
   segment an input image of the user;
   extract a frontal image from the input image based on the segmentation of the input image;
   separate a primary image of a primary component and a secondary image of a secondary component based on segmentation of the frontal image;
   extract one or more feature images corresponding to one or more features
   indicating distinct characteristics of the user based on the separated primary image;
   generate a primary graphical image of the primary image and a secondary graphical image of the secondary image separately; and
   generate an avatar with pronounced features based on merging of the primary graphical image with the secondary graphical image;
   wherein the primary component is extracted from the face mask with hair region, and the secondary component is extracted based on subtraction of the face mask without hair region from the face mask with hair region, and wherein the secondary component includes ear region of the user based on removal of the ear region from the face mask without hairs.

2. The system as claimed in claim 1, wherein the avatar generation engine (607) receives the input image from the memory unit (606) of the electronic device (601).

3. The system as claimed in claim 1, wherein the primary image corresponds to face region of the user and the secondary image corresponds to hair region of the user.

4. The system as claimed in claim 1, wherein the segmentation of the frontal image includes extraction of a face mask with hair region and a face mask without hair region.

5. The system as claimed in claim 1, wherein the avatar generation engine (607) is further configured to graphically pronounce the extracted one or more feature images.

6. The system as claimed in claim 1, wherein the avatar generation engine (607) is further configured to generate a primary canvas comprising a predicted tone of the primary component.

7. The system as claimed in claim 6, wherein the avatar generation engine (607) is further configured to merge the primary canvas with graphically pronounced one or more feature images.

8. The system as claimed in claim 1, wherein the avatar generation engine (607) further configured to enhance the primary graphical image based on addition of one or more aesthetic elements to the primary graphical image.

9. A method for automatic generation of an avatar of a user, the method comprising steps of:
   rendering, by an input device of an electronic device, a graphical user interface on a display unit of the electronic device;
   segmenting, by an avatar generation engine, an input image of the user;
   extracting, by an avatar generation engine, a frontal image from the input image based on the segmentation of the input image;
   separating, by an avatar generation engine, a primary image of a primary component and a secondary image of a secondary component based on segmentation of the frontal image;
   extracting, by an avatar generation engine, one or more feature images corresponding to one or more features indicating distinct characteristics of the user based on the separated primary image;
   generating, by an avatar generation engine, a primary graphical image of the primary image and a secondary graphical image of the secondary image separately; and
   generating, by an avatar generation engine, an avatar with pronounced features based on merging of the primary graphical image with the secondary graphical image;
   wherein the primary component is extracted from the face mask with hair region, and the secondary component is extracted based on subtraction of the face mask without hair region from the face mask with hair region, and wherein the secondary component includes ear region of the user based on removal of the ear region from the face mask without hairs.

10. The method as claimed in claim 9, wherein the primary image corresponds to face region of the user and the secondary image corresponds to hair region of the user.

11. The method as claimed in claim 9, wherein the segmentation of the frontal image includes extraction of a face mask with hair region and a face mask without hair region.

12. The method as claimed in claim 9 further comprising graphically pronouncing the extracted one or more feature images.

13. The method as claimed in claim 9 further comprising generating a primary canvas comprising a predicted tone of the primary component.

14. The method as claimed in claim 13 further comprising merging the primary canvas with graphically pronounced one or more feature images.

15. The method as claimed in claim 9 further comprising enhancing the primary graphical image based on addition of one or more aesthetic elements to the primary graphical image.

\* \* \* \* \*